United States Patent
Stoessel et al.

(10) Patent No.: US 10,156,028 B2
(45) Date of Patent: Dec. 18, 2018

(54) SPINNING PROCESS

(71) Applicant: ETH ZURICH, Zürich (CH)

(72) Inventors: Philipp R. Stoessel, Winterthur (CH); Robert N. Grass, Zürich (CH); Wendelin Jan Stark, Zürich (CH)

(73) Assignee: ETH Zurich, Zurich (CH)

( * ) Notice: Subject to any disclaimer, the term of this patent is extended or adjusted under 35 U.S.C. 154(b) by 343 days.

(21) Appl. No.: 14/894,585

(22) PCT Filed: May 21, 2014

(86) PCT No.: PCT/CH2014/000069
§ 371 (c)(1),
(2) Date: Nov. 30, 2015

(87) PCT Pub. No.: WO2014/190443
PCT Pub. Date: Dec. 4, 2014

(65) Prior Publication Data
US 2016/0130729 A1    May 12, 2016

(30) Foreign Application Priority Data

May 31, 2013    (EP) .................... 13002820

(51) Int. Cl.
    D01D 10/02    (2006.01)
    D01D 10/06    (2006.01)
    (Continued)

(52) U.S. Cl.
    CPC ............ *D01F 4/00* (2013.01); *B29C 47/0004* (2013.01); *B29C 47/0014* (2013.01); *B29C 47/0057* (2013.01); *C08L 89/06* (2013.01); *D01D 1/02* (2013.01); *D01D 5/04* (2013.01); *D01D 5/06* (2013.01); *D01D 5/12* (2013.01); *D01D 5/247* (2013.01); *D01F 1/02* (2013.01);
    (Continued)

(58) Field of Classification Search
    CPC .. D01D 1/02; D01D 5/04; D01D 5/06; D01D 5/12; D01D 5/16; D01D 5/247; D01D 10/02; D01D 10/06; D01F 4/00; D02J 1/228
    USPC ......... 264/129, 178 F, 178 R, 183, 202, 203, 264/204, 210.7, 210.8, 232, 234, 236, 343
    See application file for complete search history.

(56) References Cited

U.S. PATENT DOCUMENTS

2004/0110439 A1    6/2004    Chaikof et al.
2009/0220579 A1    9/2009    Hassingboe et al.

FOREIGN PATENT DOCUMENTS

CN    101949069 A    1/2011
EP    1911863 A1    4/2008
(Continued)

OTHER PUBLICATIONS

Ayres, Chantal E. et al., Incremental changes in anisotropy induce incremental changes in the material properties of electrospun scaffolds, Acta Biomaterialia, 2007, pp. 651-661, vol. 3.
(Continued)

*Primary Examiner* — Leo B Tentoni
(74) *Attorney, Agent, or Firm* — Larson & Anderson, LLC

(57) ABSTRACT

The present invention relates to the manufacturing gelatin fibers comprising the steps of: (a) preparing a two-phase composition as defined in the claims, (b) spinning the lower phase of said composition, (c) stretching the obtained fiber and (d) optional finishing steps; to new gelatin fibers and to the use thereof.

14 Claims, 4 Drawing Sheets

Figure 1:
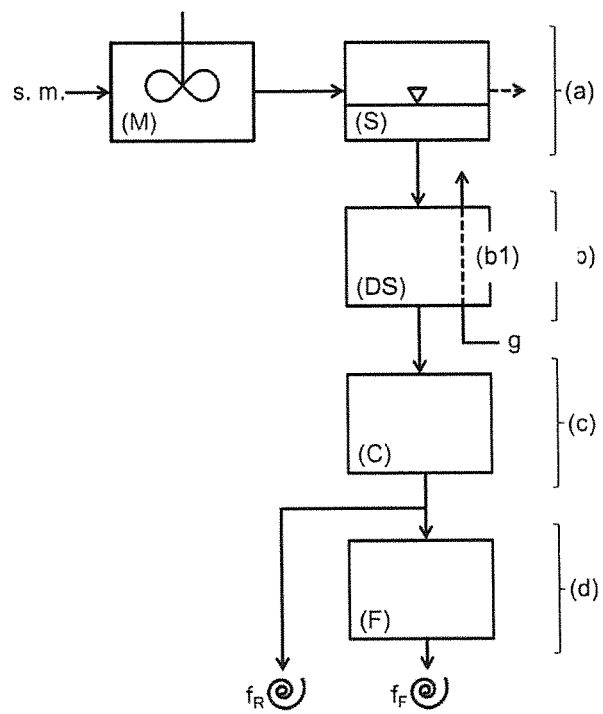

(51) Int. Cl.
*D01F 4/00* (2006.01)
*D01D 1/02* (2006.01)
*D01D 5/04* (2006.01)
*D01D 5/06* (2006.01)
*D01D 5/12* (2006.01)
*D01D 5/247* (2006.01)
*D01F 1/02* (2006.01)
*B29C 47/00* (2006.01)
*C08L 89/06* (2006.01)
*D03D 15/00* (2006.01)
*D04H 3/015* (2012.01)
*B29K 105/00* (2006.01)

(52) U.S. Cl.
CPC ............ *D03D 15/00* (2013.01); *D04H 3/015* (2013.01); *B29K 2089/00* (2013.01); *B29K 2105/0005* (2013.01)

(56) References Cited

FOREIGN PATENT DOCUMENTS

| EP | 2409718 | A1 | 1/2012 |
| JP | H0892485 | A | 4/1996 |
| JP | 2012167397 | A | 9/2012 |
| JP | 2012237083 | A | 12/2012 |
| WO | 2005054553 | A1 | 6/2005 |
| WO | 2007122232 | A2 | 11/2007 |

OTHER PUBLICATIONS

Fukae, R. et al., Preparation of Gelatin Fiber by Gel Spinning and Its Mechanical Properties, Journal of Applied Polymer Science, 2008, pp. 4011-4015, vol. 110.

Meyer, M. et al, Collagen fibres by thermoplastic and wet spinning, Materials Science and Engineering C, 2010, pp. 1266-1271, vol. 30.

Midorikawa, T. et al., Structure and Physical Properties of Gelatin Fibers Prepared by Gel-Spinning in Ethylene Glycol, Journal of Applied Polymer Science, 2012, doi: 10.1002/app.36963.

Nagura, M. et al, Structures and Physical Properties of Cross-Linked Gelatin Fibers, Polymer Journal, 2002, pp. 761-766, vol. 34, No. 10.

Yang, C. Y. et al, Fabrication of Porous Gelatin Microfibers Using an Aqueous Wet Spinning Process, Artifical Cells, Blood Substitutes, and Biotechnology, 2009, pp. 173-176, vol. 37, doi: 10.1080/10731190903041022.

SPINNING PROCESS

The present invention relates to a process for manufacturing of gelatin fibers; to new gelatin fibers, particularly porous gelatin fibers; and to uses thereof.

It is well known that gelatin is soluble in water and polar solvents. It is also known that solutions of gelatin are suitable for extrusion into a precipitating bath. The resulting fibers are rather short and of low strength.

WO2005/054553 describes a process for manufacturing gelatin fibers by dry spinning of an appropriate solution, resulting in a material of improved strength. According to this document, an aqueous solution is either spun into a coagulation bath or into the atmosphere.

WO2007/122232 describes a method of producing gelatin fibers by ejecting an appropriate solution through a nozzle while emitting pressurized air from air jet bores to stretch the obtained fiber. Although suitable, this method is considered disadvantageous due to the complex manufacturing device and the sensitivity of the process. Furthermore, non-woven structures are produced; it is neither possible to produce single fibers, nor to apply dry spinning procedures. According to this document, a gelatin solution, where gelatin is in its equilibrium, is subject to the spinning process.

T. Midorikawa et al. (*J. Appl. Polym. Sci.* 2012) discloses structure and physical properties of gelatin fibers prepared by gel-spinning in ethylene glycol. Gel spinning is considered disadvantageous when compared to dry spinning, As also evidenced in this document, FIG. 3, the fibers obtained are non-porous.

In consequence, there is a need for improved processes to manufacture gelatin fibers of high quality.

Thus, it is an object of the present invention to mitigate at least some of these drawbacks of the state of the art. In particular, it is an aim of the present invention to provide a spinning process for manufacturing of gelatin fibers which is fast, does not relay on harmful solvents, yields single gelatin fibers, and provides a product with mechanical properties comparable to polypropylene.

One or more of these objectives are achieved by the manufacturing process as defined in claim 1 and the gelatin fibers as defined in claim 11. Further aspects of the invention are disclosed in the specification and independent claims, preferred embodiments are disclosed in the specification and the dependent claims.

The present invention will be described in more detail below. It is understood that the various embodiments, preferences and ranges as provided/disclosed in this specification may be combined at will. Further, depending of the specific embodiment, selected definitions, embodiments or ranges may not apply.

Unless otherwise stated, the following definitions shall apply in this specification:

As used herein, the terms "a," "an," "the" and similar terms used in the context of the present invention (especially in the context of the claims) are to be construed to cover both the singular and plural unless otherwise indicated herein or clearly contradicted by the context.

As used herein, the terms "including", "containing" and "comprising" are used herein in their open, non-limiting sense.

The term "gelatin" is known in the field; it describes a material which is a mixture of peptides and proteins produced by partial hydrolysis of collagen; it is not limited to a particular molecular weight. The term relates to all graded of gelatin, preferably purified dry gelatin. Such gelatin typically contains 98-99% wt-% protein, the approximate composition being (by wt-%): glycine 21%, proline 12%, hydroxy-proline 12%, glutamic acid 10%, alanine 9%, arginine 8%, aspartic acid 6%, lysine 4%, serine 4%, leucine 3%, valine 2%, phenylalanine 2%, threonine 2%, isoleucine 1%, hydroxylysine 1%, methionine and histidine <1% and tyrosine <0.5%. These values vary, especially the minor constituents, depending on the source of the raw material and processing technique. Gelatin is also known as E441. The term includes both type A gelatin (obtained by hydrolysis under acidic conditions) and type B gelatin (obtained by hydrolysis under basic conditions).

The term "fiber" is known in the field; it describes a class of materials that are continuous filaments or are discrete elongated pieces, similar to lengths of thread. Fibers are typically capable of being spun into yarn. Fibers are typically of 20-200 micrometers diameter and of more than 1 m length. Fibers may contain internal pores; typically of 0.1-10 micrometers diameter, such as 0.5-5 micrometers.

The term "dry spinning" is known in the field; it describes the step of extruding a liquid through a nozzle into air (or a gaseous environment) to obtain an elongated solid product (such as a fiber). Typically, upon evaporation of solvent, the elongated product solidifies. In contrast, "wet spinning" describes extrusion into a liquid and solidification in such liquid.

The present invention will be better understood by reference to the figures; which are explained in further detail below.

In FIG. 1, a schematic set-up of the inventive process is shown where the following abbreviations are used:
s.m. starting material
g gas flow
$f_R$, $f_F$ gelatin fiber (raw or finished)
(M) Mixer
(S) Settler
(DS) Dry Spinning
(C) Stretching, Calender
(F) Finishing The individual steps (a), (b1), (c) and (d), as described below, are also assigned to the scheme.

Figure 2:
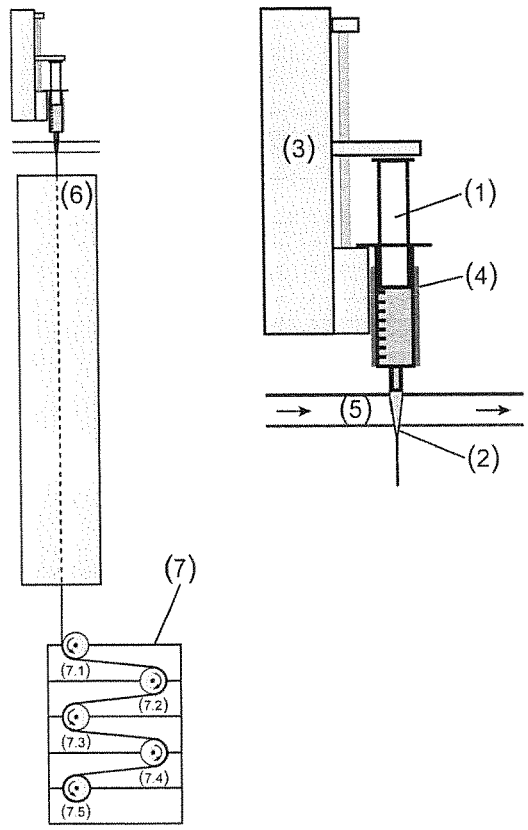
Figure 3:
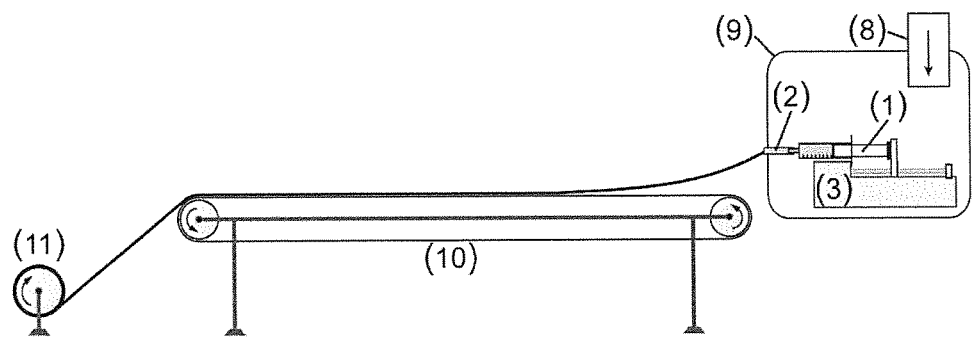

In FIGS. 2 and 3, the experimental set-up for dry spinning is shown, applying the approach of vertical spinning with multi-step stretching (FIG. 2) and of horizontal spinning with single step stretching (FIG. 3).

Figure 4:
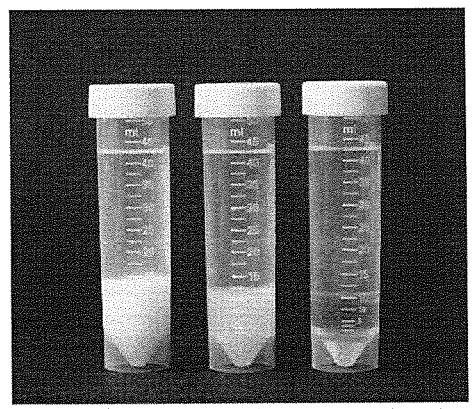

In FIG. 4, the stability of the spinning composition according to ex. 1 is shown: 30 min (left), 4 days (middle), 30 days (right).

Figure 5:
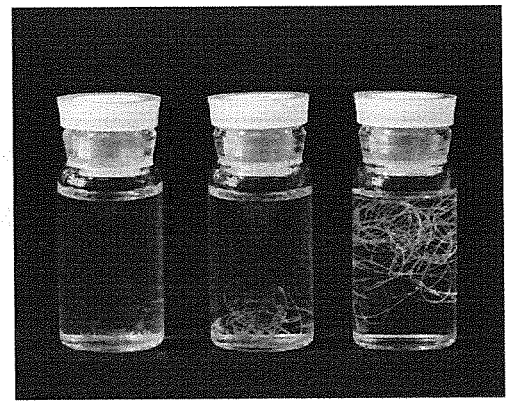

In FIG. 5, the stability of various gelatin fibers, obtained according to ex. 12 of the present invention is shown after 5 days of swelling in deion. water: untreated fibers (left); cross-linked 1 h in gaseous formaldehyde (middle); cross-linked 15 h in gaseous formaldehyde (right).

Figure 6:
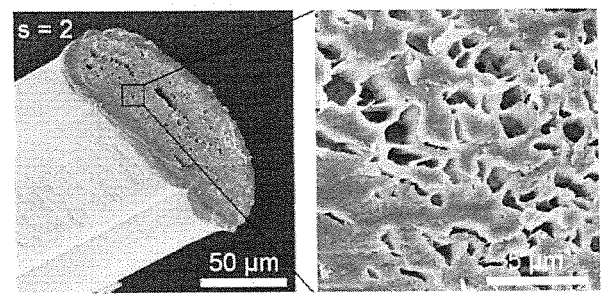
Figure 7:
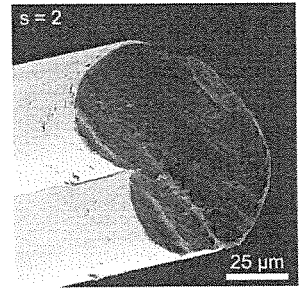
Figure 8:
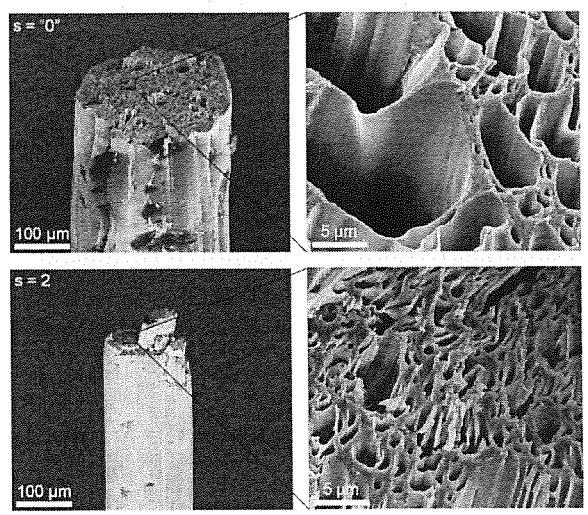

In FIGS. 6, 7 and 8, microscopy photographs are shown as obtained according to ex. 15, 16 and 17.

Figure 9:
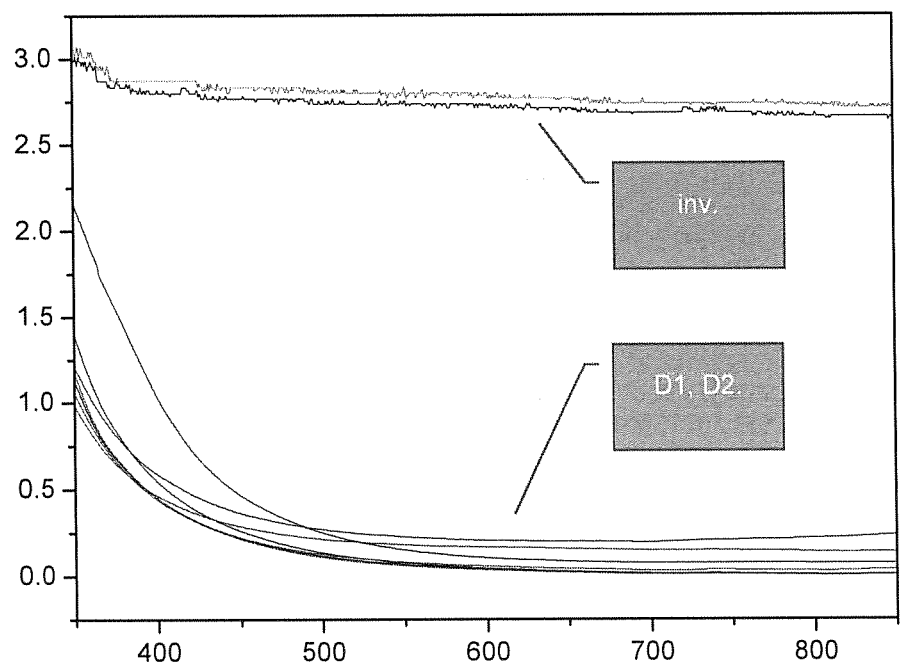

In FIG. 9, VIS spectra according to example 20 are provided; X-axis: wavelength in nm, Y-axis: absorption. The lower phase of the inventive compositions is opaque (high absorption), while the compositions according to the prior art are transparent (low absorption).

Figure 10:
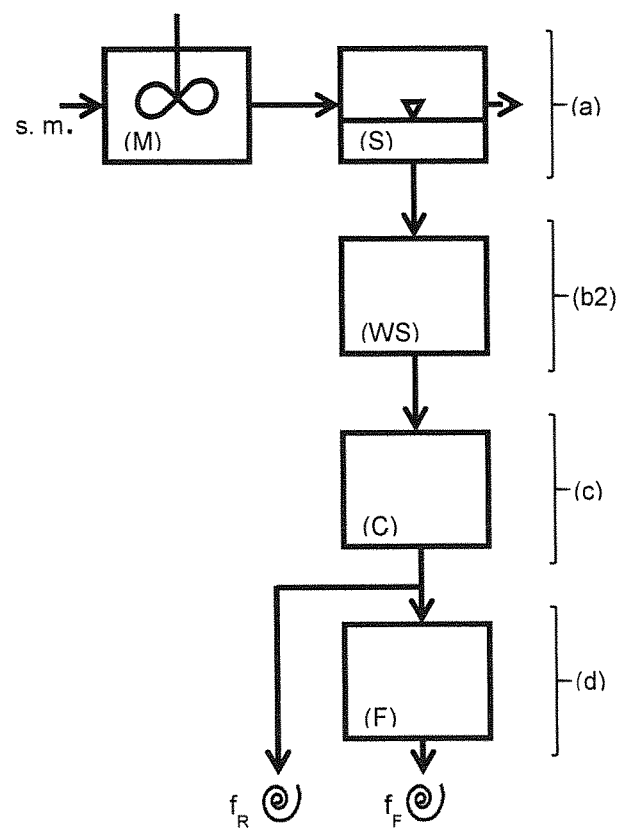

In FIG. 10, a schematic set-up of the inventive process is shown where the following abbreviations are used:
s.m. starting material
$f_R$, $f_F$ gelatin fiber (raw or finished)
(M) Mixer
(S) Settler
(WS) Wet Spinning
(C) Stretching, Calender (F) Finishing The individual steps (a), (b2), (c) and (d), as described below, are also assigned to the scheme.

Figure 11:
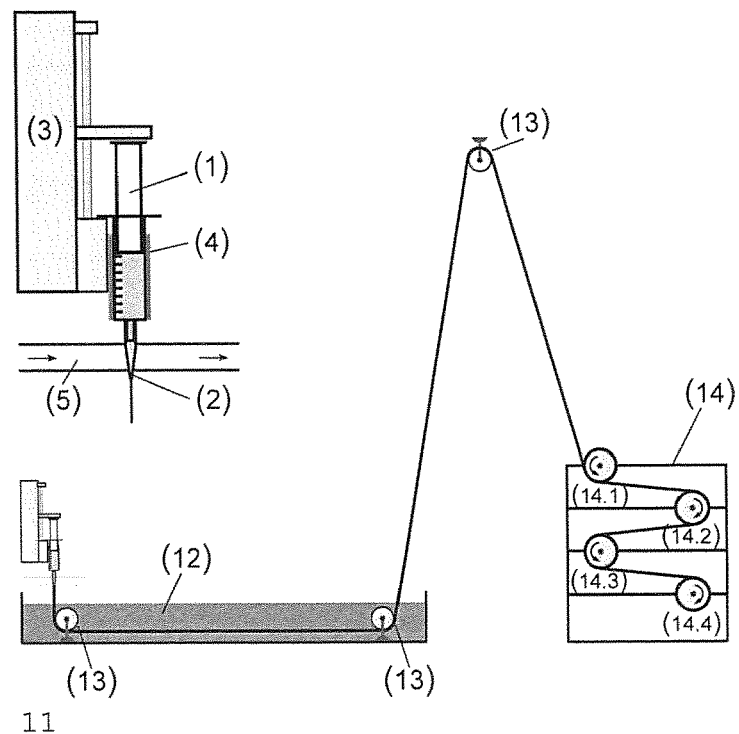

In FIG. 11, the experimental set-up is shown, applying the approach of wet spinning with multi-step stretching.

In more general terms, in a first aspect, the invention relates to a method for manufacturing of gelatin fibers. Accordingly, the invention provides a process for manufacturing of gelatin fibers, said process comprises the steps of (a) providing a composition containing (i.e. comprising or consisting of) gelatin, water, a first solvent from the group of aliphatic $C_{1-4}$ alcohols, a second solvent from the group of cyclic $C_{5-7}$ ethers, optionally additives; (b) spinning said composition; (c) stretching the obtained material; (d) optionally further treatment. In an advantageous embodiment, step (b) and/or step (c), preferably at least steps (b) and (c) are performed continuously. The inventive process converts gelatin, which is easily available from waste materials, to a fibrous material having mechanical properties comparable to other biopolymers and even some synthetic polymers. Clearly, the process provides for a product with added value.

This aspect of the invention shall be explained in further detail below.

[Temperature] It was found that the process may be performed without heating, i.e. at ambient temperatures. Accordingly, the invention provides for a process wherein the spinning (b) is performed at ambient temperature and/or the stretching (c) is performed at ambient temperatures. Ambient temperatures relates to a range between 10-40° C., preferably 15-30° C., particularly preferably 20-30° C., such as room temperature. This temperature range is considered an important advantage over the previously known processes, as the physico-chemical properties of gelatin compositions, such as viscosity of gelatin compositions, greatly vary upon temperature change. Such dependency makes industrial processes hard to control.

[Gelatin] The term is known and according to the definition provided herein. Advantageously, gelatin has a Bloom value of at least 280.

The amount of gelatin in the composition of step (a) may vary over a broad range, but typically is within 5-35 wt-%, preferably 10-30 wt-%.

[Water] Regarding the water quality, no specific measures are to be taken, commercial water from the tab is appropriate. The water may contain components for adjusting the ph (an acid, a base, a buffer) or for adjusting the ionic strength (e.g. a salt). The pH may vary over a broad range, but typically is within pH 6.5-7.5.

The amount of water in the composition of step (a) may vary over a broad range, typically within 20-60 wt-%, preferably 30-50 wt-%.

[first solvent] Aliphatic $C_{1-4}$ alcohols are known. The term includes non-substituted mono-alcohols and polyols, advantageously non-substituted mono alcohols, such as methanol, ethanol, n-propanol, iso-propanol, n-butanol, iso-butanol, sec-butanol, tert.-butanol, preferably iso-propanol.

According to the invention, either a pure $C_{1-4}$ alcohol or mixtures of two or more $C_{1-4}$ alcohols may be employed, preferably a pure $C_{1-4}$ alcohol.

The amount of said first solvent in the composition of step (a) may vary over a broad range, but typically is within 20-75 wt-%, preferably 30-60 wt-%.

[Second solvent] Cyclic $C_{5-7}$ ethers are known. The term includes non-substituted mono-ethers, di-ethers, and crown-ethers; advantageously non-substituted mono-ethers and di-ethers, such as thf and 1,4-dioxane.

According to the invention, either a pure cyclic $C_{5-7}$ ether or mixtures of two or more cyclic $C_{5-7}$ ethers may be employed, preferably a pure cyclic $C_{5-7}$ ether.

The amount of said second solvent in the composition of step (a) may vary over a broad range, but typically is within 0-20 wt-%, preferably 5-15 wt-%.

It comes as a surprise that cyclic ethers are suitable as a second solvent, as such compounds are used as solidifying components in wet spinning, see e.g. WO2005/054553.

[Additives] The term additive denotes any further component added to the composition of step (a). Suitable additives for aiding spinning processes are known. The present process allows for the use of conventional additives, if required. The term therefore includes plasticizers, oils, colorants, cross-linking substances etc. Suitable cross-linkers may be selected by the skilled person and include aldehydes, photo-activated arylazides, aglycons, tannin, transglutaminase, EDC, EGDE, chromium salts and aluminum salts.

The amount of said additives may vary over a broad range, but typically is within 0-20 wt-%, preferably 0-10 wt-%, particularly preferably 0-5 wt-%. While wet spinning is performed with higher amounts of additives, dry spinning is performed with lower amounts of additives (if any).

[Further components] The term further component denotes any component added during finishing step (d). Suitable further components for finishing are known. The present process allows for the use of conventional components, if required. It is therefore within the scope of the present invention to possibly include further components, such as coating substances (e.g. waxes, (non)-covalent surface-modifiers), plasticizers, and cross-linking substances. Suitable cross-linkers may be selected by the skilled person and include aldehydes, photoactivated arylazides, aglycons, tannin, transglutaminase, EDC, EGDE, chromium salts and aluminum salts.

The amount of such further components may vary over a broad range, but typically is within 0-10 wt-% with regards to the gelatin fiber initially obtained, preferably 0-5 wt-%. In case no finishing step (d) takes place, no further components are included.

[Gelatin Fibers] The material obtained according to the inventive process, a gelatin fiber, has outstanding properties and may be used in a vast variety of applications, as outlined below. The fiber obtained typically has a diameter of 20-200 micrometers, mainly depending on the devices used for spinning and stretching. The fiber obtained typically is of infinite length, mainly depending on the devices used for manufacturing. The fibers available by this process have a length of more than 1 meter, typically more than 100 meters. The fibers obtained typically have a smooth surface and may have internal pores. The internal pores, if present, are typically of 0.1-10 micrometers, preferably 0.5-5 micrometers diameter and a length of at least 5 times its diameter.

[Step a] To obtain the composition of step (a), the starting materials are combined by conventional means (e.g. by shaking or mixing) and allowed to separate (e.g. by sedimentation).

The addition of the specifically claimed organic solvents, first and optionally second solvent, is of key importance to the overall process and clearly distinguishes the present process from the above discussed prior art. Without being bound to theory, it is believed that the addition of solvent has a multitude of beneficial effects including (I) influencing the protein structure of gelatin and (II) fast evaporation of solvent. While the first effect allows spinning of gelatin at all, the second effect allows for dry spinning.

As noted above, the composition obtained by step (a) is a multi-phase, typically a two-phase, composition. One phase, typically the lower phase, is gelatin-rich and opaque, i.e. impenetrable by light; neither transparent nor translucent. The opacity indicates that gelatin present in this phase is predominately or completely in non-equilibrium, precipitate-like state. This phase is subject to the following step (b). The other phase, typically the upper phase, is free of (or essentially free of) gelatin. Depending on the process conditions and the starting materials, this phase may be turbid, translucent or transparent.

In one embodiment, gelatin is added as a solid material first, than the liquid starting materials (water, first and second solvent), as well as optional additives are added while stirring; followed by separating. It was found beneficial to perform step (a) at temperatures of 40-70° C., preferably 50-60° C. Typical times for combining the components are 0.1-1 hrs, such as 0.5 hrs. Typical times for separating are 0.05-0.5 hrs, such as 0.1 hrs. In one preferred embodiment, the invention thus provides for a process as described herein, wherein the composition of step (a) is obtained by combining the starting materials (steps a1 and a2) at 40-70° C. followed by phase separation (step a3) at 40-70° C.

In an alternative embodiment, the liquid starting materials (water, first and second solvent) are combined first (a1), gelatin is added as a solid material as well as optional additives while stirring (a2); followed by separating (a3). It was found beneficial to perform step (a) at temperatures of 40-70° C., preferably 50-60° C. Typical times for combining the components (a1 and a2) are 0.1-1 hrs, such as 0.5 hrs. Typical times for separating (a3) are 0.05-0.5 hrs, such as 0.1 hrs. In one preferred embodiment, the invention thus provides for a process as described herein, wherein the composition of step (a) is obtained by combining the starting materials (steps a1 and a2) at 40-70° C. followed by phase separation (step a3) at 40-70° C.

Step (a) may be performed continuously, i.e. starting materials are provided continuously, combining steps (a1 and a2) and separation step (a3) are performed continuously. Alternatively, step (a) may be performed batch-wise. It is within the ordinary skill to adapt this step (a) to the overall process.

In one preferred embodiment, an initial composition is provided by combining 10 wt-% gelatin, 40 wt-% water, 40 wt-% first solvent (e.g. iso-propanol), 10 wt-% second solvent (e.g. 1,4-dioxane). This initial composition separates into a gelatin-poor upper phase and a gelatin-rich lower phase; the latter is used in the following step (b).

[Step b] The term spinning of a compositions includes the methods of "dry spinning" and "wet spinning". The composition used in this step is the gelatin-rich, lower phase obtained in step (a). This lower phase is opaque, indicating that the gelatin is not fully dissolved. Further, this lower phase is not in its thermodynamic equilibrium, as confirmed by stability tests, c.f. FIG. 4. Accordingly, the invention provides for a process wherein in this lower phase, the gelatin is in non-equilibrium, precipitate-like state.

In one embodiment, step (b) is a dry spinning process ("b1"). Such processes are known per se, but not yet used as described in the context of the present process. Dry spinning may be realized by vertical- or by horizontal-spinning. In the vertical process, the as-spun material solidifies when falling by gravitational force towards the calendar of the following step (c). This may be aided by a counter flow of inert gas. In the horizontal process, the as-spun material may solidify on a moving support, such as a conveyor belt, before entering step (c).

In one alternative embodiment, step (b) is a wet spinning process ("b2"). Such processes are known per se, but not yet used as described in the context of the present process. In the horizontal wet spinning process, the as-spun material may solidify in a coagulation bath, before entering step (c). Suitable coagulation agents are known, and contain liquids selected from the group consisting of saturated aliphatic solvents, unsaturated aliphatic solvents, aromatic solvents, salt solutions.

It was found beneficial that standard methods and equipment may be used in both alternative steps, (b1) and (b2), to perform the inventive process.

[Step c] The active stretching (drawing) of fibers, such as dry spun fibers, is a known per se, but not yet used as described in the context of the present process. During the inventive process, stretching may take place by intrinsic stretching and active stretching. Intrinsic stretching may take place prior to step (c), e.g. due to vertical spinning, it is not included when calculating the stretching factor. Active stretching takes place in step (c). Such active stretching may be realized by a one step or by a multi step process. Typically, calendars are used for stretching. Active stretching is defined by the stretching factor, defining the ratio at the beginning and at the end of step (c). It was found that a stretching factor of 1.25-5, preferably 1.5-4, particularly preferably 1.5-3 is beneficial. The stretching factor also depends on the type of spinning, vertical vs. horizontal; for vertical spinning an upper limit of 3 is acceptable, horizontal spinning advantageously has an upper factor of 4. Without being bound to theory, it is believed that stretching supports orientation of gelatin on a molecular level and thus improves product quality.

In an advantageous embodiment, step (c) is a multi step process wherein in each of said steps the fiber is stretched by 5-50%, preferably by 5-25%, to obtain the intended final stretching factor.

[Step d] The initially obtained stretched monofilament gelatin fibers may by subjected to a further finishing step. Such post-treatment is known per se, but not yet used in the context of the present process.

A preferred post-treatment is cross-linking. It was found that the gelatin fibers obtained according to the inventive process show a significantly increased resistance towards water. The invention thus also provides for a process for manufacturing cross-linked gelatin fibers. Suitable cross-linking agents are known and include aldehydes (such as glutaraldehyde, glutaraldehyde acetals, formaldehyde), photoactivated arylazides (such as phenyl azides, hydroxyphenyl azides, diazirines), aglycons (such as genipin), tannin, transglutaminase, EDC (1-ethyl-3-(dimethylaminopropyl)-carbodiimide, EGDE (ethylene gylcol diglycidyl ether), metal salts (such as chromium or aluminium salts). Cross-linking methods are known in the field of fiber spinning and fiber processing. The person skilled in the art is in a position to adapt these known technologies to the specific materials of the present invention.

In one embodiment, step (d) comprises cross-linking of the obtained gelatin fiber. By cross-linking, the gelatin fibers become water-insoluble and/or the melting point of the gelatin fibers increases.

In one further embodiment, step (d) comprises cross-linking the obtained gelatin fiber (step d1) followed by swelling in water (step d2) followed by drying in a gas atmosphere being inert to the gelatin fiber (step d3).

In one specific embodiment, cross-linking in step (d) may be obtained by reaction with formaldehyde, such as reacting with gaseous formaldehyde at 10-40° C. for 0.2-24 hrs, such as ambient temperature for 1-15 hrs.

Another preferred post-treatment is coating. Suitable coating agents are e.g. waxes (such as paraffin waxes, beeswax), natural polymers (such as guar gum, chitosan), synthetic polymers (such as PE, PP, PES, PC, PTFE, PA as well as copolymers and blends thereof), covalent surface modifiers (such as silanes) and non-covalent surface modifiers (surfactants such as SDS, Triton, etc.)

In a second aspect, the invention relates to a novel class of gelatin fibers with improved properties. This aspect of the invention shall be explained in further detail below.

Accordingly, the invention provides for gelatin fibers obtainable by a process as described herein, or obtained according to a process as described herein, or having length and diameters as described herein.

The inventive process provides gelatin fibers, in the form of single fibers, which are of infinite length (see e.g. FIG. 5-8). That is, the length is dependent on the production line and typically more than 1 m, preferably more than 10 m. The invention therefore provides for gelatin fibers in the form of a monofilament of 20-200 micrometers diameter and more than 1 meter length.

In one embodiment, the inventive process provides gelatin fibers which are oriented. That is, the initially obtained fiber is not of the non-woven type.

The invention further provides for gelatin fibers as described herein where the gelatin is cross-linked; preferably cross-linked by formaldehyde. Such cross-linked fibers are particularly stable towards water and/or show little swelling.

The invention further provides for gelatin fibers characterized by an elastic modulus of >2400 MPa and/or a true tensile strength of >140 MPa and/or an engineering tensile strength of >80 MPa and/or gelatin fibers with a density of 60-75% of gelatin density (such as 0.8-1.1 g/cm3; preferably 0.9-0.99 g/cm3). These physical parameters may be determined by standard methods. The true tensile strength may be determined from true stress vs. true strain curves (see ex. 9); the elastic modus and the engineering tensile strength may be determined from engineering stress vs. engineering strain curves (see ex. 10); the density may be determined by measuring the apparent density of the starting material and considering the pore volume (see ex. 15). As the data show, the inventive gelatin fibers possess very good mechanical properties combined with low density.

The invention further provides for gelatin fibers as described herein that are porous. The porous structure is confirmed by microscopy, see FIG. 6, 8. Accordingly, the fibers show an essentially smooth surface and internal pores. Thus, in one embodiment the invention provides for porous gelatin fibers as defined herein wherein said porosity being characterized by internal pores having a diameter of 0.1-10 micrometers and a depth in direction of the fiber being at least 5 times of the pore diameter. Due to the porosity of the inventive fibers, beneficial thermal properties are provided. It is a clear advantage of the present gelatin fibers.

The invention further provides for gelatin fibers as described herein of high purity. Accordingly, the amount of organic solvents is low and the amount of gelatin is high. Typically, the amount of gelatin is in the range of 85-95 wt-% and the amount of water is in the range of 5-15 wt-%. The amount of first solvent is in the range of less than 5 wt-% and the amount of second solvent is in the range of less than 1 wt-%; these values may be determined by NMR.

The invention also provides for gelatin fibers as described herein, consisting of 85-95 wt-% gelatin and 5-15 wt-% water. Accordingly, these gelatin fibers are free of further components, such as additives. Such fibers are considered advantageous, as they do not show leaking.

In a third aspect, the invention relates to the use of gelatin fibers as described herein and to materials/products comprising them. This aspect of the invention shall be explained in further detail below.

Gelatin fibers, particularly gelatin fibers as described herein, may be used in woven materials, non-woven materials and fiber-reinforced materials. In principle, the stretched gelatin fibers (cross-linked and non-crosslinked) as described herein may replace conventional polypropylene fibers or nylon fibers in all of its traditional applications. Consequently, the gelatin fibers as described herein are a "green" alternative to existing materials: firstly as the starting material is a waste product from meat industry; secondly as the product is biodegradable.

Accordingly, the invention also provides for woven materials, non-woven materials and fiber-reinforced materials containing (i.e., comprising or consisting of) gelatin fibers obtainable by or obtained by a process as described herein.

The invention further provides for the use of such gelatin fibers for manufacturing woven materials, non-woven materials or fiber-reinforced materials.

The invention further provides for reinforced material comprising a matrix and gelatin fibers as described herein. In an advantageous embodiment, the matrix is selected from the group consisting of polymers, particularly polyolefines (e.g. PE, PP) and biologically degradable polymers (e.g. PLA, PLGA). As a specific embodiment, the reinforced material may be a plastic bag, the matrix being either a polyolefin or a biologically degradable polymer and the reinforcing material being the gelatin fibers as described herein.

In this embodiment, the gelatin fibers initially obtained from the inventive process may be woven to a mesh; this mesh is placed between two sheets of matrix material and combined by heat pressing. Accordingly, the invention provides a reinforced sandwich-type material comprising a first layer of matrix material, a second layer of a mesh of gelatin fibers according to the invention, a third layer of matrix material.

To further illustrate the invention, the following examples are provided. These examples are provided with no intend to limit the scope of the invention.

EXAMPLE NO. 1

Spinning Mixture Production

A spinning mixture was produced by adding deionized water and 2-propanol to gelatin powder (porcine skin, Type A, 300 g Bloom). The weight percentages were 10 wt-% gelatin, 40 wt-% deionized water and 50 wt-% 2-propanol. The mixture was tempered in a water bath at 50° C. for 30 min and shaken by hand every 5 min. Compared to an aqueous gelatin solution, this yields a system with a dense, protein-rich, opaque, precipitate-like phase and an upper, nearly transparent solvent-rich phase. After sedimentation (3 min) the upper phase was decanted; the lower, gelatin-rich phase was then transferred to a syringe where it was tempered during the spinning process and spun into gelatin fibers.

EXAMPLE NO. 2

Spinning Mixture Production

The procedure of example 1 was carried out with a different spinning mixture composition and different time intervals: deionized water, 2-propanol and 1,4-dioxane were added to gelatin powder (porcine skin, Type A, 300 g Bloom). The weight percentages were 10 wt-% gelatin, 40 wt-% deionized water 40 wt-% 2-propanol and 10 wt-% 1,4-dioxane. The mixture was tempered in a water bath at 58° C. for 3 hours and shaken by hand every 20 min. After sedimentation (5 min) the upper phase was decanted and the lower phase was spun into gelatin fibers.

EXAMPLE NO. 3

Spinning Mixture Composition

The spinning mixture was prepared as indicated in example no. 1. The spinning mixture was kept in a water bath at 50° C. and its composition measured over time by gas chromatography.

The samples for GC-FID analysis were prepared as follows. The upper, solvent-rich phase was centrifuged (15'000×g, 20 sec) to make sure that no protein particles interfere with the GC-analysis. 1-octanol was added as standard. The lower, opaque phase was transferred into a round bottom flask. All volatile compounds were then distilled into a second flask containing 1-octanol as standard. The dry weight of gelatin was gravimetrically measured. The GC-samples were analyzed using a Hewlett Packard 6890 Series gas chromatograph with a flame ionization detector (GC-FID). Helium was used as carrier gas (1 ml min-1) and the oven temperature was increased from 50 to 250° C. at a rate of 20° C. min-1. An appropriate GC-FID response factor was determined to quantify 2-propanol and 1-octanol.

|  | Sample fresh: 30 min & 3 min sediment. | | Sample after 4 days | | Sample after 30 days | |
| --- | --- | --- | --- | --- | --- | --- |
|  | lower phase | upper phase | lower phase | upper phase | lower phase | upper phase |
| gelatin (wt-%) | 27.0 | 0.1 | 36.0 | 0.0 | 36.1 | 0.0 |
| water (wt-%) | 41.2 | 46.8 | 39.3 | 37.3 | 41.5 | 27.9 |
| iPr—OH (wt-%) | 31.8 | 53.1 | 24.7 | 62.7 | 22.4 | 72.1 |
| Appear*. | Opaque, white | Slightly turbid | Opaque, yellowish | Transparent | Transparent, yellowish | Transparent |

*see also FIG. 4

EXAMPLE NO. 4

Spinning Mixture Composition

The spinning mixture was prepared as indicated in example no. 2. The spinning mixture was kept in a water bath at 58° C. The procedure of example 3 was carried out in order to measure the composition of the spinning mixture. Instead of working with one response factor only (2-propanol vs. 1-octanol), a second response factor for 1,4-dioxane vs. 1-octanol was determined.

|  | Sample fresh: 3 h & 5 min sediment. | |
| --- | --- | --- |
|  | lower phase | upper phase |
| gelatin (wt-%) | 24.9 | 0.1 |
| water (wt-%) | 44.1 | 39.0 |
| iPr—OH (wt-%) | 25.2 | 49.8 |
| 1,4-dioxane (wt-%) | 5.8 | 11.1 |
| Appearance | Opaque, white | Slightly turbid |

EXAMPLE NO. 5

Rheological Measurements

A spinning mixture was prepared as indicated in example no. 1. The mixture was stored overnight at 50° C. Before conducting rheological measurements, the sample was shaken and sedimented for 3 min. To study the effect of organic solvents in the spinning mixture, a reference sample without 2-propanol was prepared: 27 wt-% of the same gelatin were dissolved in deionized water at 50° C. A rheometer (Rheometer Paar Physica MCR300) was equipped with a cone-plate geometry (diameter 30 mm, cone-angle 4°) and a Peltier element set at 50° C. The spinning mixture and the aqueous gelatin solution were sheared in the range of 0.01 s-1 to 22 s-1 at constant temperature (50° C.). The zero shear viscosity of 27 wt-% gelatin in water was 1.3 Pa·s. The zero shear viscosity of the spinning solution (lower phase) was 9.1 Pa·s. Additionally, the spinning solution showed a significantly higher shear thinning behavior, indicating that the organic solvent in the spinning mixture induces changes in the protein structure.

EXAMPLE NO. 6

SDS PAGE of Gelatinous Samples

A spinning mixture was prepared as indicated in example no. 2. The mixture was kept in a water bath at 50° C. Aliquots were taken directly after production, after 30 min, 2 hours, 2 days and 3 months. The samples were lyophilized and then analyzed by SDS PAGE. 10 mg of protein was dissolved in 1 ml acetic acid (0.5 M) and centrifuged. 1 μl of supernatant was mixed with 2.5 μl NuPAGE LDS sample buffer, 1 μl NuPAGE reducing agent and 5.5 μl Millipore water. After denaturing at 80° C. (5 min), the samples were pipetted on the gel (NuPAGE Novex Bis-Tris). Electrophoresis was run with NuPAGE SDS running buffer at 200 V. Staining was performed with Novex colloidal blue staining kit.

The SDS PAGE gel showed characteristic protein bands at ~220, 210, 130 and 120 kDa. Hydrolytic degradation of the protein (the disappearance of the characteristic bands because of protein fragmentation) was not detectable by this method after 2 hours of storage at 50° C. After 2 days of storage at 50° C. the intensity of the bands was slightly decreased. After 3 months no characteristic protein bands were detected. This indicates that the spinning mixture is suited for processing during at least 2 hours (if prepared batch-wise).

EXAMPLE NO. 7

Vertical Dry Spinning Process

The experimental set-up is shown in FIG. 2. In this process, the lower phase of the spinning mixture (preparation according to example no. 1 or example no. 2) was transferred to a syringe (1) which was tempered with a heating pad at $T_{hp}$ (4). A plastic pipette tip (2), which was additionally tempered with a water bath to $T_w$ (5) was used as syringe nozzle. The opaque mixture in the syringe was shaken and then continuously extruded with the help of a syringe pump (3). While falling in the spinning tube (6) by gravitational force, the elastic fiber was uniformly oriented and partial solvent evaporation took place. Further orientation of the fibrous protein was obtained by transferring the fiber onto a motorized stretching device (7). The roller speed was adjusted in a way that roller 1 matched the speed of the falling fiber. An acceleration factor of 1.25× was chosen from one roller to another. The ratio of different roller speeds was defined as (active) stretching factor s. Up to several 100 meters of fiber could be taken up on one of the 5 rollers.

The fiber thus obtained was suited for direct use or could be subjected to miscellaneous treatments (e.g. cross-linking, swelling, twisting, coating etc.).

Legend to FIG. 2:
(1) syringe (e.g. plastic syringe, 20 ml)
(2) syringe nozzle (e.g. plastic pipette tip, opening diameter 0.8 mm)
(3) syringe pump (e.g. operated at Q=0.2 ml min-1)
(4) heating pad to temper syringe (e.g. $T_{hp}$=45° C.)
(5) circulating water bath to temper syringe nozzle (e.g. $T_w$=35° C.)
(6) spinning tube (e.g. 2.5 m length, 0.25 m diameter) at constant relative humidity (e.g. 50±5% R.H.) and room temperature (~23° C.)
(7) motorized stretching device (at room atmosphere) with accelerated rollers (e.g. diameter 0.11 m)
(7.1) roller 1, running at fiber fall-speed, factor s=1 (e.g. 16.4 rpm)
(7.2) roller 2, running 1.25× faster than roller 1, stretching factor s=1.25 (e.g. 20.5 rpm)
(7.3) roller 3, running 1.25× faster than roller 2, stretching factor s=1.56≈1.6 (e.g. 25.6 rpm)
(7.4) roller 4, running 1.25× faster than roller 3, stretching factor s=1.95≈2.0 (e.g. 32 rpm)
(7.5) roller 5, running 1.25× faster than roller 4, stretching factor s=2.44≈2.4 (e.g. 40 rpm)

EXAMPLE NO. 8

Horizontal Dry Spinning Process

The experimental set-up is shown in FIG. 3. The lower phase of the spinning mixture (preparation according to example no. 1 or example no. 2) was transferred to a syringe (1). The syringe was tempered in an insulated box (9), heated by a heat gun (8) to 57-59° C. A plastic pipe (2) was used as syringe outlet. The opaque mixture in the syringe was shaken and then extruded with the help of a syringe pump (3) onto the running conveyor belt (10). At the end of the conveyor belt the fiber was transferred to roller (11). By running the roller at a higher speed than the conveyor belt, the elastic fibers were drawn to multiples of their initial length. The ratio of roller speed to conveyor belt speed was defined as (active) stretching factor s; s was varied between 1 and 5.

The thus fiber obtained was suited for direct use or could be subjected to miscellaneous treatments (e.g. cross-linking, swelling, twisting, etc.).

Legend to FIG. 3:
(1) syringe (e.g. plastic syringe, 20 ml)
(2) syringe nozzle (e.g. plastic pipe, diameter 2 mm)
(3) syringe pump (e.g. operated at Q=0.2 ml min-1)
(8) heating gun to temper (e.g. set at 50-60° C.)
(9) insulated box at constant temperature (e.g. 57-59° C.)
(10) conveyor belt of 5 m length at room atmosphere (~23° C., 50±10% R.H.) running at constant speed (e.g. 3 m min-1)
(11) motorized roller with circumference of 1 m (e.g. running at 3-15 rpm)

EXAMPLE NO. 9

Tensile Testing of Non Cross-linked Gelatin Fibers

Gelatin fibers were produced as indicated in example no. 7 (vertical dry spinning). The lower phase of a spinning mixture (10 wt-% gelatin, 40 wt-% deionized water, 50 wt-% 2-propanol) was used. Fiber samples with different stretching factors were collected (s=1, 1.25, 1.6, 2.0 and 2.4). Additionally, a fiber sample was taken directly after the syringe in order to demonstrate the effect of the spinning tube and the stretching device (s=0).

The fibers were stored at room temperature (~23° C.) and constant relative humidity (45±5% R.H.) for at least 2 days. The tensile tests (n=6) were conducted in accordance to ASTM D3822-07. The tests were carried out on a Shimadzu Universal Testing Instrument AGS-X equipped with a 100 N load cell. Single fiber specimens of 40±1 mm were mounted with pneumatic clamps (3 bar) and tested at constant test speed of 24 mm min-1. The elastic modulus, true tensile strength, true strain at break and toughness were determined from true stress vs. true strain curves. The fiber cross-sections were not exactly circular, rather elliptical. Thus, an average fiber dimension, which represented the area of a hypothetical circle, was calculated. For this reason the fibers were frozen in N2 (l), cut with a scalpel (vertically to its long axis) and the cross-sectional area was measured by light microscopy (Zeiss Axio Imager.M2m). In selected fiber samples, the cross-sectional area was verified with the help of SEM pictures (FEI, NovaNanoSEM 450) and imaging software (ImageJ).

| Stretch factor s | Fiber dimension (μm) | Elastic modulus (MPa) | True tensile strength (MPa) | True strain at break (%) | Toughness (MPa) |
|---|---|---|---|---|---|
| s = 0 | 239.3 ± 22.3 | 1649.6 ± 356.3 | 50.6 ± 12.1 | 4.3 ± 1.1 | 3.3 ± 4.9 |
| s = 1 | 142.0 ± 17.0 | 2202.7 ± 177.5 | 58.6 ± 7.4 | 12.3 ± 5.6 | 5.7 ± 2.9 |
| s = 1.25 | 121.3 ± 16.8 | 2304.4 ± 129.5 | 128.7 ± 26.9 | 67.5 ± 14.6 | 57.4 ± 16.5 |
| s = 1.6 | 113.2 ± 9.7 | 2370.1 ± 263.7 | 140.6 ± 15.0 | 65.2 ± 3.8 | 58.0 ± 7.4 |
| s = 2.0 | 99.3 ± 11.0 | 2585.1 ± 152.6 | 160.6 ± 10.0 | 62.6 ± 4.3 | 61.5 ± 5.8 |
| s = 2.4 | 95.5 ± 16.2 | 2603.8 ± 281.6 | 130.5 ± 19.7 | 38.8 ± 6.4 | 31.3 ± 13.7 |

EXAMPLE NO. 10

Tensile Testing of Non Cross-linked Gelatin Fibers

Gelatin fibers were produced as indicated in example no. 8 (horizontal dry spinning). The lower phase of a spinning mixture (10 wt-% gelatin, 40 wt-% deionized water, 40 wt-% 2-propanol, 10 wt-% 1,4-dioxane) was used. Fiber samples with different stretching factors were collected (s=1, 2, 3, 4, 5). The fibers were equilibrated at 23° C. 40% R.H. for 1 day. The tensile tests (n≥10) at test speed 5 mm min-1 were carried out on an Instron Model 5864 equipped with a 100 N load cell (Instron, High Wycombe, UK). Single fiber specimens of 3-4 cm length were mounted with pneumatic clamps (3 bar). The elastic modulus, engineering tensile strength were determined from engineering stress vs. engineering strain curves. In order to determine the area of the fibers' cross-section, each specimen was examined by light microscopy (Zeiss Axio Imager.M2m). The fiber cross-sections were not exactly circular, rather elliptical; for this reason an average dimension, which represented the area of a hypothetical circle, was estimated.

| Stretching factor s | Fiber dimension (μm) | Elastic modulus (MPa) | Engineering tensile strength (MPa) |
|---|---|---|---|
| s = 1 | 193.2 ± 12.8 | 2028.1 ± 381.0 | 36.2 ± 5.6 |
| s = 2 | 144.4 ± 28 | 2009.1 ± 360.3 | 48.4 ± 12.2 |
| s = 3 | 113.7 ± 19.7 | 2464.6 ± 469.4 | 73.7 ± 14.9 |
| s = 4 | 88.7 ± 11.5 | 2662.2 ± 620.2 | 81.4 ± 18.4 |
| s = 5 | 86.7 ± 11.3 | 2888.7 ± 838.1 | 93.9 ± 23.0 |

EXAMPLE NO. 11

Tensile Testing of Non Cross-linked Gelatin Fibers at Different Test Speeds

Gelatin fibers were vertically dry spun as indicated in example no. 7 from the lower phase of a spinning mixture (10 wt-% gelatin, 40 wt-% deionized water, 50 wt-% 2-propanol). The fibers' stretching factor was held constant at s≈2.0. Storage of the fiber was at room temperature (~23° C.) and constant relative humidity (45±5% R.H.). The tensile testing procedure was carried out analogical to example no. 9 with the exception that the fiber specimens were measured at different test speeds. The latter was varied from 1 to 40 mm min-1. The elastic modulus and true tensile strength were determined from true stress vs. true strain curves.

| Test speed (mm min-1) | Elastic modulus (MPa) | True tensile strength (MPa) |
|---|---|---|
| 1 | 1998 | 103 |
| 5 | 2536 | 144 |
| 24 (ASTM D3822-07) | 2566 | 155 |
| 40 | 3120 | 149 |

EXAMPLE NO. 12

Cross-linking of Fibers and Subsequent Swelling

Gelatin fibers were vertically dry spun as indicated in example no. 7 from the lower phase of a spinning mixture (10 wt-% gelatin, 40 wt-% deionized water, 50 wt-% 2-propanol). The fibers' stretching factor was held constant at s=2.0. Storage of the fiber was at room temperature (~23° C.) and constant relative humidity (45±5% R.H.). Parts of the gelatin fiber were cross-linked with formaldehyde in gas phase (FA(g)): the fibers were exposed to 10 ml of formaldehyde (>34.5 wt-%) in a desiccator for either 1 or 15 hours. After cross-linking, the fibers were equilibrated at room temperature and 45±5% R.H. Fibers with no, 1 h or 15 h cross-linking were then swelled in distilled water for 24 h. The mechanical properties (fiber dimension, true tensile strength, elastic modulus) and the fibers' appearance were determined before, directly after swelling (wet state) and after swelling with subsequent drying at 45±5% R.H; see FIG. 5.

| | Dimension (μm) | | |
|---|---|---|---|
| | untreated | 1 h treatment | 15 h treatm. |
| Before swelling (45% R.H.) | 105.5 ± 24.6 | 102.1 ± 29.5 | 100.5 ± 23.7 |
| After 24 h in dH2O (wet) | 536.1 ± 98.2 | 222.7 ± 58.0 | 134.1 ± 30.7 |
| After 24 h in dH2O (dried, 45% R.H.) | 106.6 ± 12.1 | 93.0 ± 11.9 | 89.9 ± 8.8 |

| | True tensile strength (MPa) | | |
|---|---|---|---|
| | untreated | 1 h treatment | 15 h treatm. |
| Before swelling | 154.7 ± 19.0 | 150.5 ± 27.9 | 156.4 ± 20.7 |
| After 24 h in dH2O (wet) | 0.3 ± 0.1 | 3.5 ± 0.4 | 20.7 ± 6.3 |
| After 24 h in dH2O (dried, 45% R.H.) | 132.0 ± 4.5 | 164.9 ± 20.4 | 196.7 ± 42.7 |

| | Elastic modulus (MPa) | | |
|---|---|---|---|
| | untreated | 1 h treatment | 15 h treatm. |
| Before swelling | 2505 ± 178 | 2712 ± 295 | 2450 ± 407 |
| After 24 h in dH2O (wet) | Not measurable | Not measurable | Not measurable |
| After 24 h in dH2O (dried, 45% R.H.) | 3087 ± 178 | 3289 ± 248 | 3415 ± 379 |

| | Appearance | | |
|---|---|---|---|
| | untreated | 1 h treatment | 15 h treatm. |
| Before swelling | White, regular fiber | White, regular fiber | White, regular fiber |
| After 24 h in dH2O (wet) | Highly swelled, transparent, fiber shape lost, sinks in water | Slightly swelled, white/grey, still fiber shaped, sinks in water | Only minor swelling, white, still fiber shaped, floats in water |
| After 24 h in dH2O (dried, 45% R.H.) | White, irregular, flat fiber | White, regular fiber | White, regular fiber |

EXAMPLE NO. 13

XRD Analysis of Non Cross-linked Fibers

Gelatin fibers were vertically dry spun from the lower phase of a spinning mixture (10 wt-% gelatin, 40 wt-% deionized water, 50 wt-% 2-propanol) at different stretching factors (see example no. 7). The fibers were investigated by X-ray scattering analysis. Wide-angle X-ray scattering (WAXS) experiments were performed using a Rigaku MicroMax-002+ microfocused beam in order to obtain direct information on the WAXS reflections. The Cu Kα radiation was collimated by three pinhole collimators (0.4, 0.3, and 0.8 mm). The incident beam was normal to the surface of the film. A bundle of parallel-aligned fibers was vertically placed at 14.3 cm distance to the detector. The scattered X-ray intensity was detected by a Fuji Film BAS-MS 2025 imaging plate system. An effective scattering-vector range of 0.5 nm-1<q<25 nm-1 was obtained, where q is the scattering wave-vector defined as q=4π sin θ/λCu Kα, with a scattering angle of 2θ. From the scattering intensities, the order parameter S was defined according to the equation stated below.

$$S = \frac{1}{2}\langle 3\cos^2(\theta) - 1 \rangle = \frac{1}{2} \frac{\int_0^{\frac{\pi}{2}} I(\theta)(3\cos^2(\theta) - 1)\sin(\theta) d\theta}{\int_0^{\frac{\pi}{2}} I(\theta)\sin(\theta) d\theta}$$

The X-ray diffraction patterns of the gelatin fibers at different stretching factors showed three reflections at d1≈11 Å (q1≈5.7 nm-1), d2≈4.6 Å (q2≈13.7 nm-1) and d3≈2.8 Å (q3≈22.2 nm-1). The unstretched gelatin fiber sample which was taken directly after the syringe outlet showed an isotropic diffraction pattern (cloudy rings), indicating that the fibrous protein is randomly distributed. In stretched fibers the reflections are less cloudy and especially the reflection at d1≈11 Å—which corresponds to the distance between triple-helices—shows clear anisotropy. Overall a highly oriented amorphous structure was achieved. The increase of the order parameter S is presented below.

| Stretching factor s | Order parameter S for scattering vector q1 (q1 = 4.0-7.0 nm-1) | Order parameter S for scattering distance d2 (q2 = 10.0-18.0 nm-1) |
|---|---|---|
| directly after syringe "s = 0" | 0.22 | 0.05 |
| s = 1 | 0.63 | 0.06 |
| s = 1.25 | 0.55 | 0.15 |
| s = 1.6 | 0.68 | 0.35 |
| s = 2.0 | 0.59 | 0.27 |
| s = 2.4 | 0.78 | 0.41 |

EXAMPLE NO. 14

XRD Analysis of Non Cross-linked Fibers

Gelatin fibers were horizontally dry spun from the lower phase of a spinning mixture (10 wt-% gelatin, 40 wt-% deionized water, 40 wt-% 2-propanol, 10 wt-% 1,4-dioxane) at different stretching factors (see example no. 8). The fibers were investigated by X-ray scattering analysis by carrying out the procedure of example no. 13.

The X-ray diffraction patterns of the gelatin fibers at different stretching factors showed the same three reflections at d1≈11 Å (q1≈5.7 nm-1), d2≈4.6 Å (q2≈13.7 nm-1) and d3≈2.8 Å (q3≈22.2 nm-1). The anisotropy significantly increased by stretching the fiber at the end of the conveyor belt. Overall a highly oriented amorphous structure was achieved. The increase of the order parameter S is presented in table below.

| Stretching factor s | Order parameter S for scattering vector q1 (q1 = 4.0-7.5 nm-1) | Order parameter S for scattering distance d2 (q2 = 10.0-17.0 nm-1) |
|---|---|---|
| s = 1 | 0.0 | 0.0 |
| s = 2 | 0.59 | 0.31 |
| s = 3 | 0.90 | 0.45 |
| s = 4 | 0.87 | 0.56 |
| s = 5 | 0.86 | 0.46 |

EXAMPLE NO. 15

Porosity and Density Measurements

Gelatin fibers were vertically dry spun as indicated in example no. 7 from the lower phase of a spinning mixture (10 wt-% gelatin, 40 wt-% deionized water, 50 wt-% 2-propanol). The fibers' stretching factor was held constant at s=2. In order to investigate the fiber morphology, fiber specimens were frozen in N2 (l) and cut with a scalpel vertically to its long axis. Scanning electron microscopy (FEI, NovaNanoSEM 450, 5 kV) was used to depict the fibers' cross-sections. While the fibers showed a very smooth surface, the inside structures were very porous. With the help of imaging software (ImageJ) the pore area of different cross-sections was determined. The average porosity of fibers (s=2) was 30%. See FIG. 6.

The apparent density of gelatin (porcine skin, Type A, 300 g Bloom) was measured by the Archimedes method (immersion in THF): it was 1.37 g ml-1. It is acceptable to deduce the gelatin fiber density by multiplying the gelatin density with (1-porosity). Thus, the apparent density of gelatin fiber (s=2) is 0.96 g ml-1.

The linear density of the gelatin fiber (s=2) was identified to be 69 dtex (g/10'000 m).

EXAMPLE NO. 16

Manufacturing of Gelatin Fibers without Pores

Gelatin fibers were vertically dry spun from the lower phase of a spinning mixture (10 wt-% gelatin, 40 wt-% deionized water, 50 wt-% 2-propanol). The procedure of example no. 7 was followed except for not shaking the syringe with the tempered spinning mixture by hand before spinning. The fibers' stretching factor was held constant at s=2. In order to investigate the fiber morphology, fiber specimens were frozen in N2 (l) and cut with a scalpel vertically to its long axis. Scanning electron microscopy (FEI, NovaNanoSEM 450, 5 kV) was used to depict the fibers' cross-sections. The fibers showed a very smooth surface and no pores. See FIG. 7. The fibers' density is thus assumed to be the same as for unprocessed gelatin (1.37 g ml-1).

EXAMPLE NO. 17

Scanning Electron Microscopy of Gelatin Fibers' Fracture Sites

Gelatin fibers were vertically dry spun as indicated in example no. 7 from the lower phase of a spinning mixture (10 wt-% gelatin, 40 wt-% deionized water, 50 wt-% 2-propanol). Stretching factors s="0" (directly after the syringe) and s=2 were chosen. The gelatin fibers were subjected to a tensile test (see example 9). The fracture sites were then examined by scanning electron microscopy (FEI, NovaNanoSEM 450, 5 kV). The fracture site of an unoriented fiber (s="0") was straight and sharp. In contrast, the fracture site of a stretched fiber (s=2) was fringy and fibrous; see FIG. 8.

The results confirm that stretching induces segmental orientation of the fibrous protein.

EXAMPLE NO. 18

Thermogravimetric Analysis

Gelatin fibers were horizontally dry spun from the lower phase of a spinning mixture (10 wt-% gelatin, 40 wt-% deionized water, 40 wt-% 2-propanol, 10 wt-% 1,4-dioxane) (see example no. 8). Stretching factors s=1 and s=3 were chosen. Untreated gelatin (porcine skin, Type A, 300 g Bloom) was also tested. Thermogravimetric analysis was performed with a TGA Q500 (TAinstruments) at a heating rate of 20° C. min-1. 1-7 mg of an equilibrated sample (23° C. and 40% R.H.) were heated from 30-500° C. under airflow. In all samples there was an initial decrease in weight because of moisture and/or organic solvent evaporation. From 200-250° C. upwards, a fast weight loss was recorded which is related to thermal degradation. The onset degradation temperature for untreated gelatin was 240° C., while both gelatin fibers (s=1 and s=3) started to degrade at 220° C.

EXAMPLE NO. 19

Elemental Microanalysis

Gelatin fibers were vertically dry spun from the lower phase of a spinning mixture (10 wt-% gelatin, 40 wt-% deionized water, 50 wt-% 2-propanol) (see example no. 7). The fibers' stretching factor was held constant at s=2. Untreated gelatin (porcine skin, Type A, 300 g Bloom) was also tested. Storage of the samples was at room temperature (~23° C.) and constant relative humidity (45±5% R.H.). The carbon, hydrogen, nitrogen and sulfur content of the samples were measured with an Elementar vario MICRO cube. The ash content of the samples was gravimetrically determined by heating the sample to 600° C. for 30 min. The oxygen content was estimated as 100 wt-% minus the sum of C %, N %, H %, S % and ash content.

| Sample | C (%) | H (%) | N (%) | S (%) | ash (%) | O (%) |
|---|---|---|---|---|---|---|
| Gelatin fiber s = 2 | 45.31 | 7.15 | 15.78 | 0.41 | 2.50 | 28.87 |
| Gelatin G2500 | 45.73 | 6.85 | 15.55 | 0.45 | 2.5 | 28.92 |

| Sample | C/N ratio | O/N ratio | C/H ratio | N/H ratio |
|---|---|---|---|---|
| Gelatin fiber s = 2 | 2.87 | 1.83 | 6.34 | 2.21 |
| Gelatin G2500 | 2.94 | 1.86 | 6.68 | 2.27 |

EXAMPLE NO. 20

Comparative Spinning Experiments

To further elaborate the performance of the inventive process, comparative data to known spinning processes were generated. The table below indicates various compositions and analytical details. As can be seen, only the inventive compositions form an opaque 2-phase system, as further evidenced by FIG. 9. Only the inventive compositions allow for dry spinning, fiber length more than 100 m. In contrast, the known compositions according to D1 (WO'232, above) and D2 (Midorikawa, above) are unsuited for dry spinning. These known compositions are suited for wet spinning or rotation spinning (resulting in non-woven materials) at best. As shown above, ex. 3, the lower phase of the inventive compositions contains more than 30 wt % 2-propanol, which is significant higher than the compositions according to D1 and thus a specific distinguishing feature. As the data show, this higher amount of solvent significantly influences properties and behavior of the compositions, particularly enabling dry spinning.

| | spinning mixture composition | | | | VIS-abs. (400 nm) (—) | VIS-abs. (600 nm) (—) | VIS-abs. (800 nm) (—) | | |
|---|---|---|---|---|---|---|---|---|---|
| | gelatin (wt %) | dH$_2$O (wt %) | org. sol. (wt %) | Spinning mixture appearance | | | | Behaviour when being spun | Maximal fiber length |
| inventive | 10 | 40 | 50 2-propanol | lower phase opaque/white: supernatant turbid, phase separation | 2.872 (lower phase) | 2.783 (lower phase) | 2.723 (lower phase) | robust spinning with continuous stretching | >100 m |

-continued

| | spinning mixture composition | | | | | | | | |
|---|---|---|---|---|---|---|---|---|---|
| | gelatin (wt %) | dH$_2$O (wt %) | org. sol. (wt %) | Spinning mixture appearance | VIS-abs. (400 nm) (—) | VIS-abs. (600 nm) (—) | VIS-abs. (800 nm) (—) | Behaviour when being spun | Maximal fiber length |
| inventive | 10 | 40 | 50 1-propanol | lower phase opaque/white: supernatant turbid, phase separation | 2.799 (lower phase) | 2.737 (lower phase) | 2.359 (lower phase) | robust spinning with continuous stretching | >100 m |
| D1 (ex. 4) | 30 | 65 | 5 2-propanol | transparent, yellow, No phase separation | 0.450 | 0.041 | 0.005 | not possible to dry spin: only drops falling off from nozzle | 0 m |
| D1 (ex. 5) | 30 | 70 | 0 | transparent, yellow, NO phase separation | 0.451 | 0.034 | 0.002 | not possible to dry spin: only drops falling off from nozzle | 0 m |
| D1 (ex. 9 h) | 40 | 52 | 8 2-propanol | transparent, yellow, NO phase separation | 0.547 | 0.046 | 0.007 | drops fall out from nozzle and stretch into a fiber; fiber breaks as soon as it touches the roller | 3.5 m |
| D1 (ex. 9 k) | 37 | 48 | 15 | transparent, yellow, NO phase separation | 0.589 | 0.205 | 0.216 | not possible to dry spin; only drops falling off front nozzle | 0 m |
| D1 (ex. 9 l) | 34.5 | 43.5 | 22 1-propanol | transparent, yellow, No phase separation | 0.463 | 0.165 | 0.139 | drops fall out from nozzle and stretch into a fiber; fiber breaks as soon as it touches the roller | 3.5 m |
| D1 (ex. 9 p) | 35 | 55 | 10 1-propanol | transparent, yellow, No phase separation | 0.440 | 0.057 | 0.030 | drops fall out from nozzle and stretch into a fiber; fiber breaks as soon as it touches the roller | 3.5 m |
| D2 | 15 | 0 | 85 ethylene glycol | transparent, yellow, No phase separation | 1.037 | 0.105 | 0.072 | Drops formed at nozzle; some drops fall off, others are drawn into very short fibers | 0.1-0.2 m |

EXAMPLE NO. 21

Wet Spinning Process

The experimental set-up is shown in FIG. 11. In this process, the lower phase of the spinning mixture (preparation according to example no. 1 or example no. 2) was transferred to a syringe (1) which was tempered with a heating pad at $T_{hp}$=55° C. (4). A plastic pipette tip (2), which was additionally tempered with a water bath to $T_w$=35° C. (5) was used as syringe nozzle. The opaque spinning mixture was then continuously extruded with the help of a syringe pump (3). The gelatin fiber was coagulated in an ethanol bath (12) at room temperature (~23° C.). The air gap between the nozzle and coagulation bath was 5 cm and the bath length 1.8 m. The fiber was then continuously conveyed in the bath and air-dried over a stretch of 3 m. Orientation of the fibrous protein was achieved by transferring the fiber onto a motorized stretching device (14). The roller speed was adjusted in a way that roller 1 matched the speed of the conveyed fiber.

Legend to FIG. 11:
(1) syringe (e.g. plastic syringe, 20 ml)
(2) syringe nozzle (e.g. plastic pipette tip, opening diameter 0.8 mm)
(3) syringe pump (e.g. operated at Q=0.1 ml min-1)
(4) heating pad to temper syringe
(5) circulating water bath to temper syringe nozzle
(12) coagulation bath
(13) non-motorized deflection rollers
(14) motorized stretching device (at room atmosphere) with accelerated rollers (e.g. roller diameter 0.11 m)
(14.1) roller 1, running at the speed of the conveyed fiber, stretching factor s=1 (e.g. 10 rpm)
(14.2) roller 2, running 2× faster than roller stretching factor s=2 (e.g. 20 rpm)
(14.3) roller 3, running 3× faster than roller 1, stretching factor s=3 (e.g. 30 rpm)
(14.4) roller 4, running 4× faster than roller 1, stretching factor s=4 (e.g. 40 rpm).

EXAMPLE NO. 22

Tensile Testing of Non Cross-linked Gelatin Fibers

Gelatin fibers were produced as indicated in example no. 21 (wet spinning). The lower phase of a spinning mixture (10 wt-% gelatin, 40 wt-% deionized water, 50 wt-% 2-propanol) was used. In line with example no. 20, the lower phase was opaque. Fiber samples with different stretching factors were collected (s=1, 2, 3, 4). The fibers were stored at room temperature (~23° C.) and constant relative humidity (45±5 % R.H.) for at least 2 days. The tensile tests (n=10) were conducted in accordance to ASTM D3822-07. The tests were carried out on a Shimadzu Universal Testing Instrument AGS-X equipped with a 100 N load cell. Single fiber specimens of 40±1 mm were mounted with pneumatic clamps and tested at constant test speed of 24 mm min$^{-1}$. The elastic modulus, engineering tensile strength and engineering strain at break were determined from engineering stress vs. engineering strain curves. The fiber cross-sections were not exactly circular, rather elliptical. Thus, an average fiber dimension, which represented the area of a hypothetical circle, was calculated. For this reason the fibers were frozen in N2 (l), cut with a scalpel and the cross-sectional area was measured by light microscopy (Zeiss Axio Imager.M2m).

| Stretching factor s | Fiber dimension (µm) | Elastic modulus (MPa) | Engineering tensile strength (MPa) | Engineering strain at break (%) |
|---|---|---|---|---|
| s = 1 | 147 | 1782 | 47 | 4 |
| s = 2 | 137 | 1847 | 45 | 4 |
| s = 3 | 93 | 2962 | 105 | 65 |
| s = 4 | 78 | 3764 | 178 | 38 |

EXAMPLE NO. 23

Application of Plasticizers

Spinning mixtures were prepared as indicated in example no. 1. In addition, triethylene glycol (TEG) or ethylene glycol (EG) were added as plasticizer. The percentage of plasticizer was chosen between 10 to 200 wt-% based on the gelatin weight. The composition of the spinning mixtures were as follows:

| Sample name | gelatin (wt-%) | deionized water (wt-%) | 2-propanol (wt-%) | plasticizer (wt-%) |
|---|---|---|---|---|
| TEG10 | 10 | 40 | 49 | 1 |
| TEG25 | 10 | 40 | 47.5 | 2.5 |
| TEG50 | 10 | 40 | 45 | 5 |
| TEG100 | 10 | 40 | 40 | 10 |
| TEG200 | 9.1 | 36.4 | 36.4 | 18.1 |
| EG100 | 9.1 | 36.4 | 45.4 | 9.1 |
| EG200 | 7.7 | 30.8 | 46.1 | 15.4 |

Analogous to example no. 20 phase separation occurred yielding opaque spinning phases. The lower phases of the spinning mixtures were wet spun as indicated in example no. 21. In order to investigate the plasticizer content in the spinning mixture, the supernatants were analyzed by high-performance liquid chromatography coupled to a mass spectrometer (HPLC-MS, Agilent 1100 LC/MSD). Elemental microanalysis (Elementar vario MICRO cube) was used to measure the effective plasticizer content in the equilibrated protein fibers by considering the decrease in nitrogen content. The results are summarized in the table below. From these measurements it is concluded that large amounts of plasticizer were lost in the supernatant of the spinning mixture as well as in the coagulation bath. Losses of EG were higher than for TEG.

| Sample name | plasticizer content in the spinning phase (wt-%) | effective plasticizer content in fiber (wt-% of gelatin) |
|---|---|---|
| TEG10 | 5.5 | 2.5 |
| TEG25 | 15.1 | 3.4 |
| TEG50 | 33.5 | 6.1 |
| TEG100 | 57.1 | 8.9 |
| TEG200 | 127.2 | 12.0 |
| EG100 | 83.3 | 3.1 |
| EG200 | 158.8 | 5.5 |

The equilibrated fibers (room temperature, 45±5% R.H.) were mechanically tested (elastic modulus, engineering tensile strength, engineering strain at break) as described in example 22. The effect of the plasticizer is clearly demonstrated by the increase in strain at break and decreasing stiffness and strength. The effect is more prominent in fibers plasticized with TEG.

| Sample name | Elastic modulus (MPa) | Engineering tensile strength (MPa) | Engineering strain at break (%) |
|---|---|---|---|
| TEG10 | 3054 | 159 | 41 |
| TEG25 | 2904 | 138 | 45 |
| TEG50 | 2674 | 93 | 51 |
| TEG100 | 2605 | 75 | 47 |
| TEG200 | 2320 | 72 | 54 |
| EG100 | 3080 | 148 | 48 |
| EG200 | 2837 | 131 | 50 |

EXAMPLE NO. 24

Morphology of Wet Spun Non Cross-linked Gelatin Fibers

Gelatin fibers were produced as indicated in example no. (wet spinning). The lower phase of a spinning mixture (10 wt-% gelatin, 40 wt-% deionized water, 50 wt-% 2-propanol) was used. Fiber samples with different stretching factors were collected (s=1, 2, 3, 4). In order to investigate the fiber morphology, fiber specimens were frozen in $N_2$ (l) and cut with a scalpel. Scanning electron microscopy (FEI, NovaNanoSEM 450, 5 kV) was used to depict the fibers' cross-sections. All the fibers showed a very smooth surface. Fibers produced at s=1 and s=2 showed high porosity, comparable to dry spun fibers from example no. 15 (FIG. 6). Further stretching (s=3) led to a decrease in porosity. In maximally stretched fibers (s=4) no pores were observed. It is concluded that the fiber porosity can be tailored by different degrees of stretching.

The invention claimed is:

1. A process for manufacturing gelatin fibers comprising the steps of:
   (a) preparing a composition comprising
       5-35 wt % of gelatin,
       20-60 wt % of water,
       2-75 wt % of a first solvent selected from the group of aliphatic $C_{1-4}$ alcohols,
       0-20 wt % of a second solvent selected from the group of cyclic ethers having 5-7 ring members, and
       0-10 wt % additives;
   (b) spinning a lower phase of said composition to form a spun product;
   (c) stretching (drawing) said spun product by a factor of 1.25-5;
   (d) optionally further treatment;
   wherein at least steps (b) and (c) are continuously performed, and wherein steps (b) and (c) are performed at ambient temperature, and wherein the composition of step (a) comprises two phases and wherein a lower one of said phases is gelatin-rich and opaque.

2. The process of claim 1, wherein said step (b) is dry spinning.

3. The process of claim 1, wherein said step (b) is wet spinning.

4. The process of claim 1, wherein said gelatin has a Bloom value of at least 280 g.

5. The process of claim 1, wherein
   said aliphatic alcohol is selected from the group consisting of isopropanol and ethanol and/or
   said second solvent is not present
   and/or said additives are not present.

6. The process of claim 1, wherein the composition of step (a) is obtained by
   combining the starting materials (gelatin, water, first solvent, second solvent, if present and additives if present) and heating to 40-70° C.; followed by
   phase separation at 40-70° C. to obtain an opaque, gelatin-rich phase.

7. The process of claim 1, wherein said step (b) comprises spinning of a gelatin composition where the gelatin is in a non-equilibrium, precipitate-like state.

8. The process of claim 1, wherein said step (c) is a multi step process having a plurality of substeps, wherein in each of said substeps the fiber is stretched by 5-50% to obtain the intended final stretching factor.

9. The process of claim 1, wherein said step (d) comprises cross-linking the obtained gelatin fiber; or
cross-linking the obtained gelatin fiber followed by swelling in water followed by drying in an gas atmosphere being inert to the gelatin fiber; and/or
coating the obtained gelatin fiber.

10. The process of claim 1, wherein said gelatin fibers
are of 20-200 micrometers diameter; and/or
are of more than 1 m length; and/or
comprise internal pores of 0.1-10 micrometers diameter.

11. The process of claim 6, wherein said step (b) comprises spinning of a gelatin composition where the gelatin is in a non-equilibrium, precipitate-like state.

12. The process of claim 11, wherein said step (c) is a multi step process having a plurality of substeps, wherein in each of said substeps the fiber is stretched by 5-50% to obtain the intended final stretching factor.

13. The process of claim 6, wherein said step (c) is a multi step process having a plurality of substeps, wherein in each of said substeps the fiber is stretched by 5-50% to obtain the intended final stretching factor.

14. A method for forming a gelatin fiber, comprising the steps of
  (a) forming an gelatin-rich and opaque composition containing gelatin; and
  (b) spinning the gelatin-rich and opaque composition to form a spun product;
  (c) stretching (drawing) said spun product by a factor of 1.25-5.

* * * * *